June 15, 1926.

R. C. LEAKE 1,589,319

DESK CIRCUIT CONTROLLER

Filed Nov. 20, 1922     4 Sheets-Sheet 1

R. C. Leake, Inventor

By his Attorney

Neil W. Preston

June 15, 1926.

R. C. LEAKE 1,589,319

DESK CIRCUIT CONTROLLER

Filed Nov. 20, 1922  4 Sheets-Sheet 2

Inventor
R. C. Leake,
By his Attorney
Neil D. Preston

June 15, 1926.

R. C. LEAKE 1,589,319

DESK CIRCUIT CONTROLLER

Filed Nov. 20, 1922    4 Sheets-Sheet 4

Fig. 9.

Inventor
R. C. Leake,
By his Attorney
Neil D. Preston

Patented June 15, 1926.

1,589,319

UNITED STATES PATENT OFFICE.

RICHARD C. LEAKE, OF ROCHESTER, NEW YORK, ASSIGNOR TO GENERAL RAILWAY SIGNAL COMPANY, OF ROCHESTER, NEW YORK.

DESK CIRCUIT CONTROLLER.

Application filed November 20, 1922. Serial No. 602,042.

This invention relates to circuit controllers, and more particularly to combined circuit controllers and indicators for operating railway signaling and switching appliances.

In the operation of trains on modern railways, it is often found desirable to operate switches and signals at a point a considerable distance from a despatcher's station, ticket station, tower or the like. If such switches and signals are located at a great distance, it is practically impossible to operate them manually through suitable pipe connections, cables or the like, and even if this can be done it is rather uncertain whether the device so operable will at all times be positioned to correspond to the operating handle at the station end. It sometimes happens that such a pipe connected system develops a break near the distance point, so that it is impossible to determine whether the device at such control point has been operated, or whether the pipes only have been moved to the operated position.

With the above operating conditions and other considerations in mind, the principal objects and purposes of the present invention contemplate the provision of electrically operated signals, switches, derails and the like, and means having suitable and reliable interlocking features for controlling such devices from a distance; to provide in combination with such electrical devices electrically operated indicators to indicate the position thereof, whether or not certain portions of the track are occupied, and whether or not such controller has been automatically locked against movement. Further objects and purposes consist in the provision of a combined circuit controller and indicator, which is compactly constructed so that any of its component parts may be removed as a unit, and which may be installed on the usual office desk or on a bench board.

Other objects, purposes and characteristic features of the invention will appear as the description thereof progresses.

In describing the invention in detail, reference will be made to the accompanying drawings, in which:—

Figure 4:
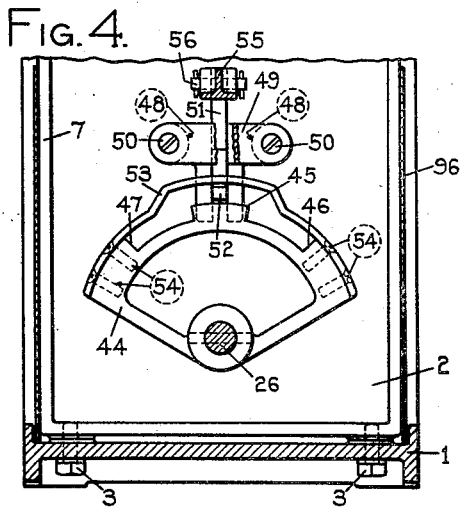
Fig. 4 is a sectional view taken on the line 4—4, Fig. 1, as viewed in the direction of the arrows.
Figure 7:
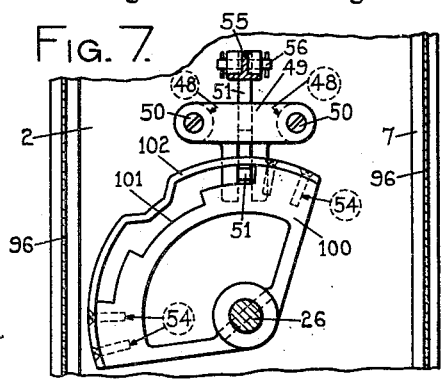
Fig. 7 shows a view similar to Fig. 4 of a circuit controller embodying a modified form of locking sector.
Figure 8:
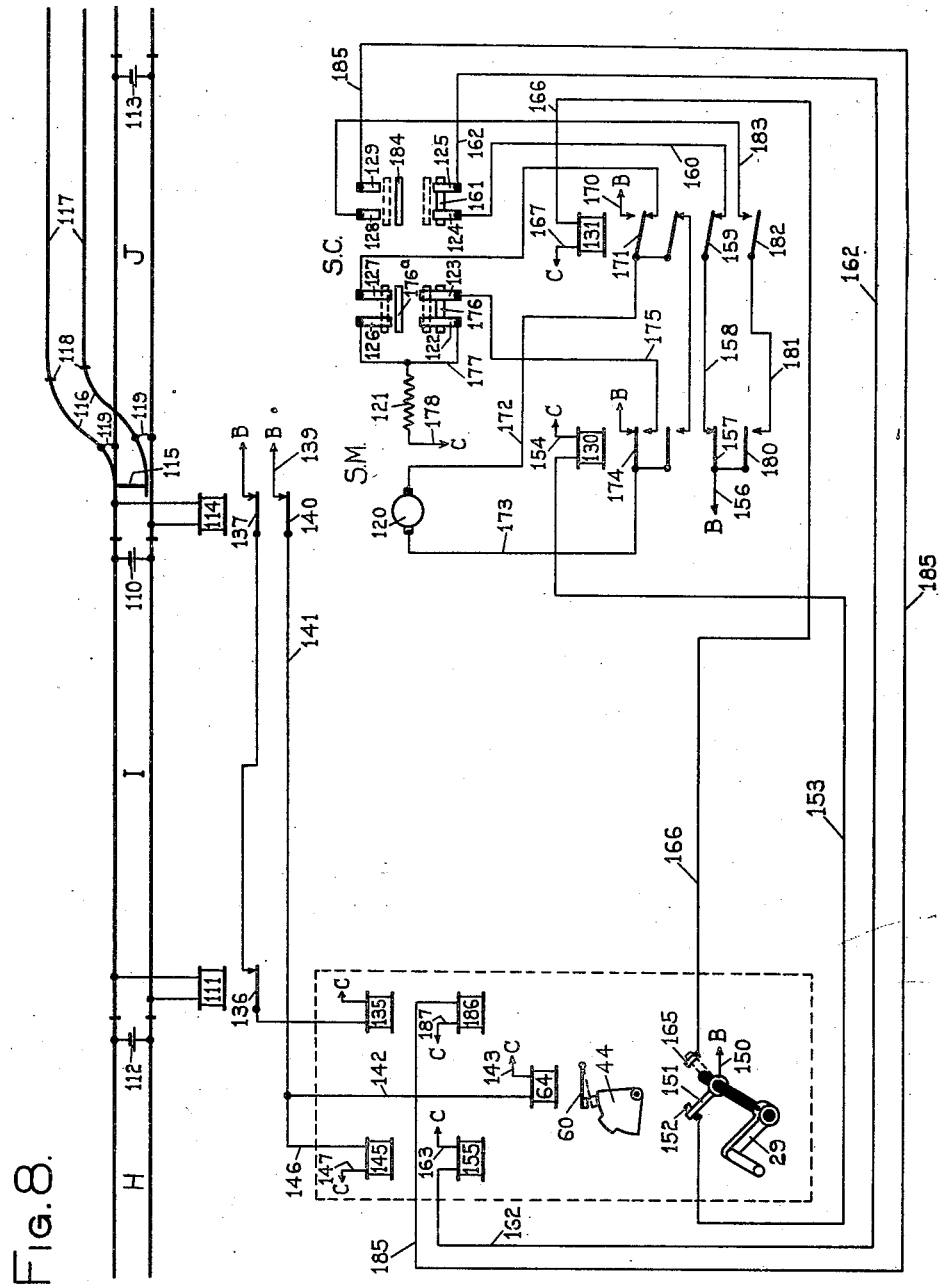

Fig. 8 is a wiring diagram of a system including the desk circuit controller embodying the present invention which employs the detector locking sector shown in Fig. 4, the circuit controller being connected to operate a switch machine motor; and Fig. 9 is a similar wiring diagram wherein a similar circuit controller is employed for operating a switch machine, the circuit controller being electrically locked by the indication locking sector shown in Fig. 7.

Figure 1:
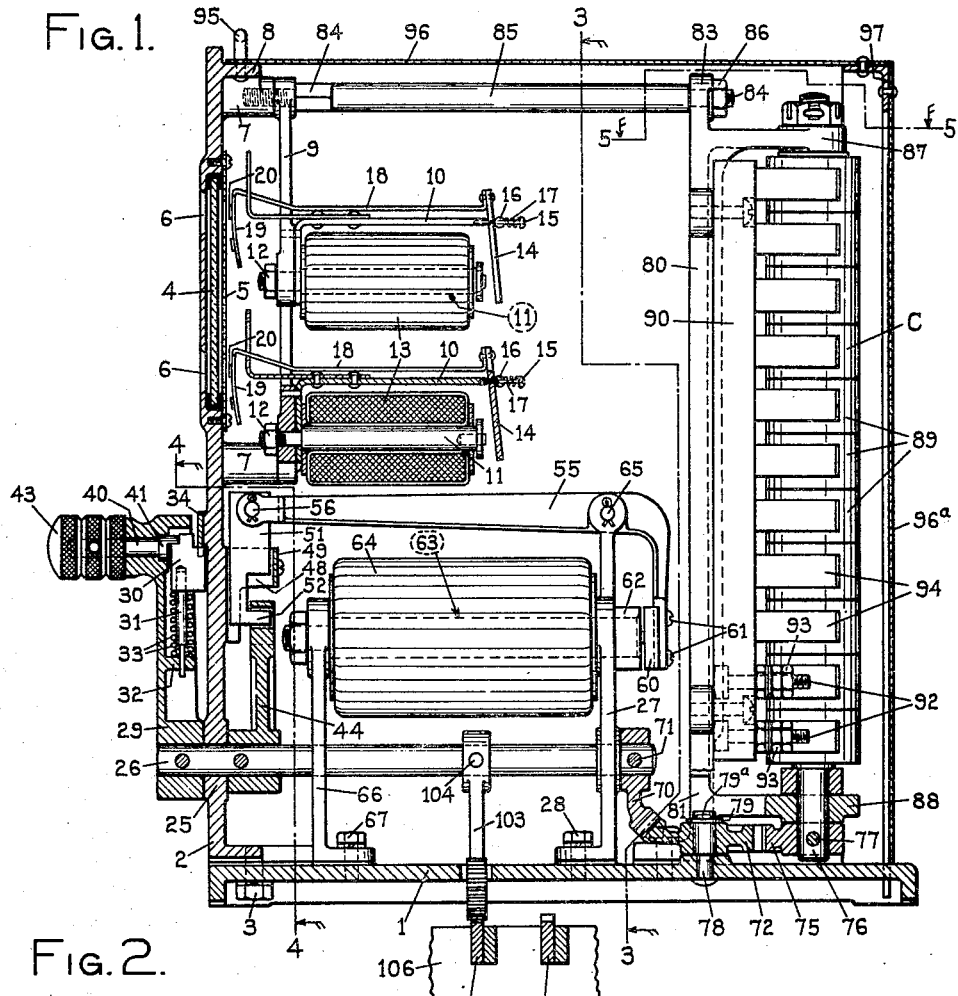
Figure 1 shows a vertical cross section of a desk circuit controller embodying the present invention taken parallel to the axis of the main operating shaft.
Figure 2:
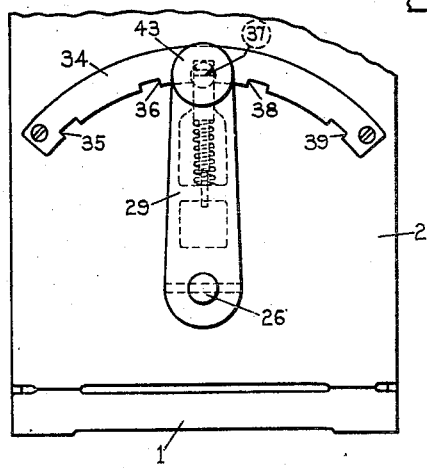
Fig. 2 is a partial front elevation of the device, particularly showing the handle and locking segment.
Figure 3:
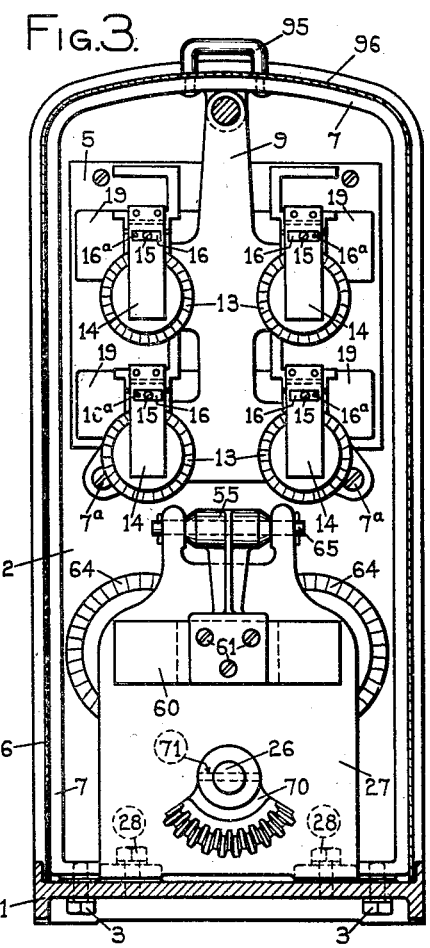
Fig. 3 is a sectional elevation taken on the line 3—3, Fig. 1, as viewed in the direction of the arrows.
Figure 5:
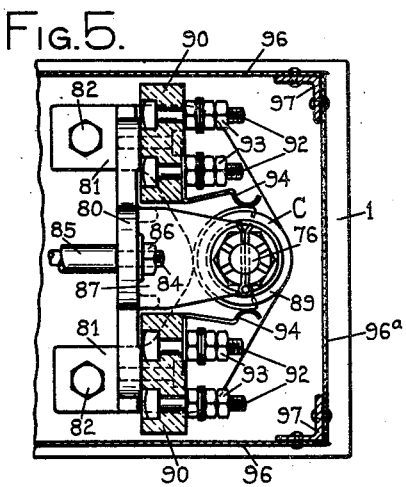
Fig. 5 is a sectional view taken on the line 5—5, Fig. 1, looking in the direction of the arrows, the terminal boards being shown in section.

Referring particularly to Fig. 1 of the drawings, 1 represents the base of the circuit controller embodying the present invention to which is bolted a front or face plate 2, preferably made of cast iron, by cap screws 3. This face plate 2 is provided with a suitable flanged opening in which is supported a glass panel 4 held in place by a backing plate 5, having suitable signal openings 6. This face plate is also provided with extensions 7 and a flange 8 extending along the sides and top thereof. Against the extensions 7 is bolted an indicator supporting frame 9 by screws 7ª (see Fig. 3). On this indicator supporting frame are supported suitable target-type indicators, in a manner so that the indicating targets will be positioned back of the openings 6 when information corresponding to that of the target is to be given.

Each of these indicators comprises a bracket 10 secured against the indicator supporting frame 9 by a core 11, which is turned down to a smaller diameter and threaded to form a bolt held in place by the nut 12. This bracket 10 and core 11 are made of magnetic material to substantially complete a magnetic circuit for the coil 13 supported on the core 11. The end of the bracket 10 is shaped to form a knife edge in which the notch in the armature 14 is adapted to rest, this bracket 10 also being drilled and threaded to receive the screw 15 passing through the roller 16, which is yieldingly urged against the armature 14 by a spring 17 to form a roller bearing, and which is provided with a pin 16$^a$ (see Fig. 3) fitting loosely in a hole in the armature 14 to maintain proper alignment of this roller, the hole crosswise through the roller 16 containing the screw 15 being large enough to allow the desired movement of the roller. If desired, a ball may be used instead of the roller 16 in substantially the same manner. Riveted to the armature 14 is an arm 18, which is bent down in the form of an arc to serve as the banner of the indicator 19, to which are secured suitable indicating plates 20 provided with the desired indicia. The arm 18 and banner 19 are preferably constructed of a light nonmagnetic material, such as aluminum for instance, non-magnetic material being preferable to avoid magnetic flux from pulling this arm 18 downward against the action of the armature 14.

The lower part of the front or face plate 2 is provided with a bearing portion 25 in which is journaled the main operating shaft 26, the other end of this shaft 26 being supported by the pedestal 27 fastened to the base plate 1 by cap screws 28. On the end of the shaft 26 projecting through the face plate 2 is pinned a crank or operating handle 29. This crank 29 is provided with a recess in which is slidably supported a lock bolt 30 provided with a pin 31 guided in the perforated wall 32. A compression coil spring 33 bearing against the wall 32 urges the lock bolt 30 upward to engage the locking segment 34, which is provided with notches 35, 36, 37, 38 and 39 to provide a full normal, half-normal, intermediate, half-reverse, and full reverse positions respectively. The end of the handle 29 is provided with a spindle 40, having a head 41 partly cut away to form an eccentric extension, and having its opposite end provided with an operating knob 43; whereby the turning of the knob will cause the eccentric extension to move the lock bolt 30 downward out of engagement with the notches of the locking segment 34.

Directly back of the face plate 2 is a locking sector 44 fixedly connected to the shaft 26. In the embodiment of the invention shown in Fig. 1, this locking sector 44 is provided with a locking shoulder 45, and with two limiting shoulders 46 and 47 (see Fig. 4). Directly above this locking sector 44 the front plate 2 is provided with two rearwardly extending bosses 48, across which is secured a strap 49 by screws 50, thus forming a guide to receive the lock dog 51. This lock dog 51 is provided with an extension 52 adapted to engage the shoulders 45, 46 and 47, respectively, of the locking sector 44. In order to assure that the extension 52 of the lock dog 51 will be moved downwardly to engage the shoulder 45 after being moved from its normal position as shown in Fig. 4, a force-drop cam or retainer has been provided comprising the strap 53 fastened to the shoulders 46 and 47 respectively by screws 54. It is thus seen that when the locking sector is moved from one direction or the other to its neutral position as shown, the lock dog will be forced down by the cam 53, thus assuring locking of the sector 44.

This lock dog 51 is adapted to be raised out of engagement with the shoulder 45 by an electro-responsive device, comprising the angle lever 55 pivotally connected to the lock dog 51 by the pin 56 extending through a bifurcated end thereof, the other end of this angle lever 55 being provided with an armature 60 fastened thereto by screws 61. This angle lever 55 is pivotally supported in the bifurcated extension of the pedestal 27 by the pin 65, the angle lever being comparatively wide at this point (see Fig. 3) to form a substantial pivotal connection. The armature 60 is adapted to be attracted to move the lock dog upwardly by the flux emanating from one to the other of the pole pieces 62 of the cores 63, which is created by current flowing in the coils 64 contained on the cores, the back end of the cores 63 being supported by a bracket 66 of magnetic material, thus forming a back yoke for the electro-responsive device. This bracket 63 is supported from the base plate 1 by cap screws 67. It is thus seen that when the coils 64 are energized the armature 60 will be attracted, thereby lifting the lock dog out of engagement with the locking shoulder 45 of the locking sector 44.

Figure 6:
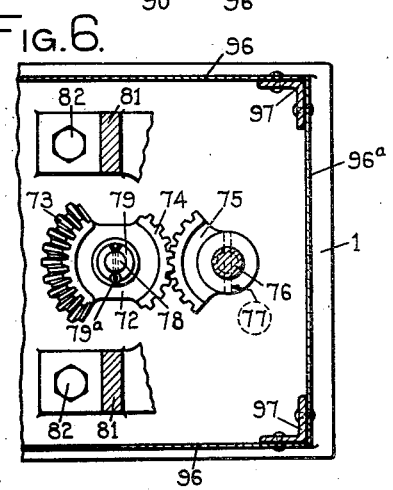
Fig. 6 is a horizontal section taken through the lower part of the controller drum shaft, illustrating the driving mechanism for the drum.

To the rear end of the operating shaft 26 is fastened a bevel-gear segment 70 (see Fig. 3) by a pin 71. This bevel-gear sector operatively engages a compound gear 72, comprising a bevel-gear sector 73 on one side thereof, and a spur-gear sector 74 on the other side, more clearly illustrated in Fig. 6. This compound gear 72 is pivotally supported to the base plate 1 by a journal 78 riveted thereto as shown, displacement of this gear being prevented by the washer 79 maintained in position by the cotter pin 79$^a$. This spur-gear portion 74 of the compound gear 72 operatively engages a spur-gear sector 75 pinned to the lower end of the controller shaft 76 of the controller C by a pin 77. This controller C comprises a separate unit which may be readily detached from the rest of the desk circuit controller, and consists of an upstanding controller frame 80 having two projecting legs 81 fastened to the base plate 1 by cap screws 82, the top end of this controller frame 80 being provided with a perforated extension 83 bolted to the front plate 2 by a bolt 84, a spacing sleeve 85 and nut 86, this bolt 84 and spacing sleeve 85 also supporting the indicator bracket 9 heretofore described.

The controller frame 80 of the circuit controller C is provided with two rearwardly extending arms 87 and 88 terminating in bearing portions, in which the controller shaft 76 is pivotally supported. On the controller shaft 76 are adjustably secured a plurality of drum sections 89, each of which is separately adjustable with respect to the shaft 76, so that the contact segment fastened to each of these insulated drum sections may be adjusted in any desired relation to the shaft to complete or interrupt circuits in the desired sequence as the controller drum is rotated. The specific manner of connecting the controller drum sections, not being a part of the present invention, has not been shown in detail. On each side of the upstanding controller drum formed by the plurality of drum sections 89 is provided a terminal board 90 of insulating material provided with suitable binding posts, comprising bolts 92 and nuts 93 which also serve as securing means for holding the contact finger 94 against the controller drum sections 89.

Into the flange 8 extending from the front plate of the circuit controller casing is riveted a staple 95 (see Figs. 1 and 3), over which a slot in the top wall of the cover 96 is adapted to pass. This cover 96 comprises a piece of sheet metal bent in the form of an inverted U adapted to fit over the flange 8 extending around the front wall 2, the back wall of this cover 96 comprising a piece of sheet metal 96ª fastened to the remaining portions of the cover by a U-shaped piece of angle iron 97 riveted to these two portions. The ends of the U-shaped angle iron 97 pass through slots provided in the base plate 1 when the cover is in place. In order to prevent removal of the cover by unauthorized persons, this cover may be locked in place by a padlock or seal in the staple 95.

It is sometimes found desirable to employ a plurality of desk circuit controllers of the type just described, and to provide means whereby the operation of some of these controllers may be prevented when certain other circuit controllers are in a certain operated position, that is, to provide mechanical interlocking means between such controllers.

In order to interlock desk circuit controllers embodying the present invention in this manner, a gear segment 103 riveted to the operating shaft 26 by a pin 104 has been provided. This gear sector 103 operatively engages the teeth of a rack portion of the lock bar 105 slidably supported in the locking bed 106. A similar lock bar 107 similarly connected to another circuit controller (not shown) has been illustrated. In practice, these lock bars are adapted to operate suitable tappets (not shown) to lock and unlock certain other lock bars under predetermined conditions, and likewise these lock bars may be locked by tappets operated by other lock bars as well understood by those skilled in the art. In practice, when a plurality of desk circuit controllers of this type are mechanically interlocked as just explained, these controllers are mounted directly on the locking bed 106.

In Fig. 7 has been illustrated a modified form of locking sector similar to the locking sector shown in Fig. 4, this locking sector 100 serving to lock the operating handle against movement to the two extreme positions, thereby facilitating the same for indication locking purposes. Instead of the locking shoulder 45 of the locking sector 44, the locking sector 100 is provided with an elongated notch 101. This locking sector 100 is also provided with a force-down cam retainer 102, which is shaped to force the lock dog 51 into the notch 101 as the locking sector is moved to its neutral position.

*Description of Fig. 8.*—In Fig. 8 has been illustrated diagrammatically a trackway layout including a siding or turnout, having a switch operated by a switch machine controlled by the circuit controller embodying the present invention. The trackway shown comprises a block I having a track battery 110 and a track relay 111, a portion of the block H provided with a battery 112 and a block J provided with a battery 113, a track relay 114, and having a siding switch 115 operated by the switch machine SM shown diagrammatically in Fig. 8, the rails 116 being insulated from the rails 117 of the siding by insulated joints 118. These rails 116 are bonded to the block J by bonds 119 to provide the usual detector track circuit, whereby the track relay 114 will be deenergized when any portion of the block J or the rails 116 of the siding are occupied, or are in a dangerous condition for some other reason.

The wiring diagram of Fig. 8 represents the essential elements of the desk circuit controller embodying the present invention connected to operate the motor of the switch machine SM shown conventionally for operating the switch 115 in the block J. This switch machine SM includes the usual switch bar operator and locking bar (not shown);

and a motor comprising an armature 120 and a field winding 121, a circuit controller SC adapted to connect contacts 122 and 123, and contacts 124 and 125, or contacts 126 and 127 and contacts 128 and 129 respectively when the switch machine is in one of its extreme positions and depending upon whether it is in its normal or reverse position. This circuit controller being actuated to the neutral position as shown by the dotted lines (by suitable means not shown) as soon as the motor starts to rotate and before the switch bar for operating switch 115 begins to move, is moved to its other extreme position when the switch machine has completed its cycle of operation. The purpose in providing this operating feature in the switch machine is to permit reversal of the motor, by the operator before the machine has completed its operating cycle, if desired. Other essential elements of this switch machine SM comprise suitable relays 130 and 131, preferably located at a very short distance from the switch machine suitably housed in a moisture proof casing.

*Operation of Fig. 8.*—Under normal operating conditions which will for convenience be assumed to be the conditions shown in the drawings, that is, with the switch 115 closed so that the train ordinarily will continue its movement from the block I to the block J and with the blocks I and J unoccupied, the indicator magnet 135 will be energized to indicate unoccupied, thereby informing the operator at the station that the blocks I and J, which may be at a distance and invisible, are clear. The circuit for energizing this indicator magnet 135 includes the front contact 136 of the track relay 111 and the front contact 137 of the track relay 114. Likewise, when the block J and the detector track circuit including the rails 116 are clear, the coils 64 of the locking magnet will be energized through a circuit which may be traced as follows:—beginning at the terminal B of a suitable source of energy which has its other terminal connected to a common return wire C, wire 139, front contact 140 of track relay 114, wires 141 and 142, coils 64 of the locking magnet, wire 143 back to the common return wire C. To indicate to the operator whether or not the coils 64 of the locking magnet are energized, the indicator 145 has been provided which is connected in multiple with the coils 64 through the partial circuit including the wire 146, winding of the indicator 145 and wire 147, thereby causing the indicator 145 to indicate unlocked when the track relay 114 is energized.

With the handle 29 of the disk circuit controller in the full normal position, the relay 130 is energized through a circuit which may be traced as follows:—beginning at the terminal B of a battery, wire 150, contact segment 151 (shown conventionally), contact finger 152, wire 153, winding of the relay 130, wire 154 back to the common return wire C. The energization of this relay 130, assuming the switch machine to be in the normal position as illustrated, completes a circuit for energizing the normal indicator 155, which may be traced as follows:—beginning at the terminal of a battery B, wire 156, front contact 157 of relay 130, wire 158, back contact 159 of relay 131, wire 160, stationary contact 124, movable contact 161, stationary contact 125, wire 162, winding of the indicator 155, wire 163 back to the common return wire C, thus indicating that the switch machine is in its normal position.

Let us assume that the block J or the detector track circuit comprising the rails 116 are occupied by a train, and that the operator is attempting to operate the circuit controller to actuate the switch machine to the other position. The operator will be unable to move the operating handle to the reverse position as indicated by dotted lines because the lock magnet is deenergized, due to the deenergization of the track relay 114 and the dropping of the front contact 140. Likewise, the indicator 145 will indicate locked instead of unlocked.

Let us assume that this train is to enter the turnout or siding, and in order to do so moves into the block I. As soon as this train leaves the track section J, the lock magnet and indicator 145 will be energized, allowing the operator to move the lever to the reverse position. At the initial movement of the handle 29 from the normal toward the reverse position, the circuit through the relay 130 will be broken, thereby interrupting the circuit through the normal indicator 155 heretofore traced. If the handle 29 is now moved to the full reverse position as indicated in dotted lines, a circuit will be completed for energizing the relay 131 which may be traced as follows:— beginning at the terminal B of the battery, wire 150, controller contact segment 151, spring finger 165, wire 166, winding of the relay 131, wire 167 back to the common return wire C.

The energization of the relay 131 when the switch machine is in its normal position as illustrated, will complete a circuit through the armature 120 and field winding 121 of the motor of the switch machine, which may be traced as follows:—beginning at the terminal B of a battery, wire 170, movable contact 171 of the relay 131, wire 172, armature 120, wire 173, movable contact 174 of relay 130, wire 175, stationary contact 123, movable contact 176 and stationary contact 122 of the circuit controller SC, wire 177, field winding 121 of the switch machine motor, wire 178 back to the common return wire C. The relative directional current flow through the armature 120 and the field winding 121, as just traced, will cause the motor to operate in a direction to open the switch 115, allowing the train to pass into the siding. The initial rotation of the motor operates the movable contacts of the circuit controller SC to the dotted position shown, thereby interrupting the signal circuit through the indicator 155 without interrupting the circuit through the motor itself.

When the motor has completed its cycle of operation and has thrown the switch 115 over and locked it in the usual manner, the circuit controller SC will be thrown over to interrupt the energizing circuit for the motor just traced and complete an indication circuit, which may be traced as follows:—beginning at the terminal B of a battery, wire 156, back contact 180 of the relay 130, wire 181, front contact 182 of the relay 131, wire 183, stationary contact 128, movable contact 184 and stationary contact 129 of the circuit controller SC, wire 185, through the magnet of the switch machine reverse indicator 186, wire 187 back to the common return wire C. The train is now permitted to enter the siding, and as soon as the first axle enters the block J the controller handle 29 will again be locked by the deenergization of the track relay 114 for reasons heretofore explained. As soon as the train has entered the siding beyond the detector track circuit, that is, beyond the insulating joints 118, the handle 29 will again be unlocked due to the energization of the track relay 114, because this track relay 114 is no longer shunted by the axles of the train.

It should be noted that further locking of the handle 29 may be accomplished by suitable mechanical interlocking through the interlocking frame 106 heretofore described, and likewise by suitable electrical interlocking. Such electrical interlocking may be accomplished by taking the circuit for the locking magnet 64 through the appropriate contacts of another desk circuit controller for operating cooperating mechanism, such as a signal, through contacts operated by relays, signal mechanism, switch machines and the like, so that the desk circuit controller can only be actuated when certain predetermined conditions and positions of devices are present.

*Description of Fig. 9.*—In Fig. 9 has been illustrated the same track layout employing the same type of switch machine as that shown in Fig. 8, and in order to simplify the description of this application of the invention like parts have been given the same reference characters. In this application of the invention, the circuit controller has been provided with a locking sector, such as shown in Fig. 7 of the drawings, this locking sector being adapted to serve as an indication lock, that is, as a lock to prevent the movement of a lever or handle to the full normal or full reverse position, as the case may be, unless the switch machine has been operated to that position. The purpose of such a lock is to facilitate the unlocking of the handle, whereby it may be moved to the full extreme position (full normal or full reverse), whereby some other related or cooperating switch or signal lever may be unlocked, such unlocking being accomplished either electrically or mechanically, as desired. If such unlocking of another signal or switch lever is to be accomplished electrically, the circuit for the locking magnet of such signal or switch lever is taken through the contact on one of the sectional drums of the desk circuit controller illustrated, such contact only being closed when the handle is in such extreme position. If such interlocking between several circuit controllers is to be accomplished mechanically, this may be done by the usual tappet and plate interlocking machine structure as illustrated by the locking bed 106 and its associated parts.

Referring particularly to Fig. 9, and assuming clear traffic conditions and the apparatus in the normal position as illustrated in this figure, the indicator 135 is energized and indicates unoccupied, the energizing circuit being completed through the front contacts 136 and 137 of the track relays 111 and 114 respectively. The indicator 155 indicates normal and is energized through the circuit heretofore traced in connection with this indicator 155 in Fig. 8 of the drawings.

*Operation of Fig. 9.*—Let us assume that it is endeavored to operate the switch points of the switch 115 to allow a train to pass into the siding, and further to unlock some other lever (not shown) after such operation of the switch has been completed. By moving the circuit controller handle 29 toward the right a short distance, that is, to the half normal position, the locking magnet 64 will be energized through a circuit which may be traced as follows:—beginning at the terminal B of a battery, wire 156, front contact 157 of the relay 130, wire 158, back contact 159 of the relay 131, wire 160, stationary contact 124, movable contact 161, and stationary contact 125 of the circuit controller SC, wires 162 and 190, contact finger 191, contact segment 192, wire 193, coils 64 of the locking magnet, wire 194 back to the common return wire C. Further movement of the handle 29 toward the right, namely, to the middle position, breaks the circuit through the relay 130 heretofore traced in connection with Fig. 8, thereby interrupting the circuit through the coils 64 of the locking magnet and likewise through the normal indicator 155. If now the handle 29 is moved to the right to the half reverse position, the contact segment 151 will reach the stationary contact finger 165 simultaneously with the connection made between the contact segment 192 and the stationary contact finger 195.

The connection of the contact segment 192 with the contact finger 195 does not complete a circuit for the locking magnet at this time, because this circuit is open at the stationary contacts 128 and 129 of the circuit controller SC. The movement of the contact segment 151 into electrical connection with the contact finger 165, however, completes a circuit through the relay 131 as heretofore traced in connection with Fig. 8. The energization of this relay 131 completes the proper circuit for the armature 120 and field winding 121 of the switch machine motor for operating this switch machine to its reverse position, in the same manner as heretofore described. If for any reason the switch machine should not reach its full reverse position, due to breakage of certain parts or the interruption of a circuit or the like, the handle 29 of the desk circuit controller can not be moved to the full reverse position, because the locking sector 100 is locked into position as defined by the notch 101; and therefore certain other levers or desk circuit controller drums which are locked until this particular handle 29 is moved to its full reverse position can not be operated. If the switch machine should be started on its cycle of operation, and should get stuck or jammed, and be prevented from completing its cycle, the motor may be reversed to bring the machine back to its original normal position, this being possible because both the movable contacts 176 and 176ᵃ complete their respective partial circuits as shown in the dotted position, thereby permitting the motor to be operated in either direction dependent on the position of the operating handle 29.

If, however, the switch machine completes its cycle of operation and at the end of such cycle throws over the circuit controller SC, an unlocking circuit will be completed which may be traced as follows:— beginning at the terminal B of a battery, wire 156, back contact 180 of the relay 130, wire 181, front contact 182 of relay 131, wire 183, stationary contact 128, movable contact 184 and stationary contact 129 of the circuit controller SC, wires 185 and 196, contact finger 195, contact segment 192 of the desk circuit controller drum, wire 193, coils 64 of the locking magnet, wire 194 back to the common return wire C. Simultaneously with the energization of this locking magnet, a circuit will be completed through the first portion of the circuit just traced and wire 197, reverse indicator 186, wire 198 back to the common return wire C. The energization of this indicator 186 advises the operator that the switch machine has completed its movement, and that he may complete the movement of his handle to the full reverse position, thereby unlocking such other conflicting switch or signal levers.

A combined circuit controller and indicator has thus been provided for operating various types of electrically actuated trackway appliances for railway systems, which may be installed in various ways, and which is especially well adapted for mounting upon a telegraph operator's desk, and the like; and which may be electrically or mechanically interlocked with other similar circuit controllers and levers, this desk type circuit controller being built up in units which permits ready replacement of parts, and also interchangement of parts to suit the particular operating conditions.

Having thus shown and described one particular embodiment of my invention, and having illustrated several ways in which the invention may be applied, I desire to have it understood that various changes, additions, adaptations, and modifications of the invention may be made without departing from the spirit and scope thereof.

What I desire to secure by Letters Patent of the United States, is:—

1. In a desk circuit controller, the combination of a sub-base having lock bars slidably mounted therein, of a circuit controller mounted on said sub-base comprising a casing having a front panel provided with a plurality of electrically operated indicators, a circuit controller drum supported vertically in the rear of the casing, an operating member extending through the front panel and operatively connected to said circuit controller drum, electrically releasable means for locking said member, and means extending from said member and operatively engaging one of said lock bars.

2. A desk type circuit controller comprising, a base member, a front panel provided with openings, electrically actuated indicators back of said openings, a vertically disposed circuit controller drum mounted on said base member and extending substantially to the top of said front panel, an operating member operatively connected to said drum extending through said front panel near the bottom thereof, a locking sector on said operating member provided with locking shoulders, a lock dog adapted to engage said shoulder, and an electro-responsive means for operating said dog.

3. A desk type circuit controller comprising, a casing, a horizontally disposed rotatable operating member near the bottom in said casing having a handle projecting to the outside of said casing, a plurality of slidable lock bars disposed below said member and arranged crosswise thereof, a vertically disposed circuit controller drum in said casing, means for operatively connecting said operating member to said drum, electrically releasable locking means for locking said member, and a gear sector extending from said member and engaging teeth in one of said lock bars.

4. A circuit controller of the type which may be set directly on top of the usual office desk comprising, a casing of general boxlike shape having a front wall containing a transparent panel near the top thereof, electro-responsive indicators back of said transparent panel, a horizontally disposed shaft arranged in the bottom of said casing extending through the front panel thereof and having a gear sector thereon projecting through the bottom of said casing, a lock bar of the rack type operatively meshing with said gear sector, an operating handle on the portion of said shaft projecting through the front wall, a vertically disposed circuit controller drum pivotally supported in the back of said casing and operatively connected to said shaft, and electrically operated means adapted to lock said shaft in predetermined positions.

5. A circuit controller of the type which may be set directly on top of the usual office desk comprising, a casing of general boxlike shape having a front wall containing a transparent panel near the top thereof, electro-responsive indicators back of said transparent panel, a horizontally disposed shaft arranged in the bottom of said casing extending through the front panel thereof and having a gear sector thereon projecting through the bottom of said casing, a lock bar of the rack type operatively engaging said gear sector, an operating handle on the portion of said shaft projecting through the front wall, a vertically disposed circuit controller drum pivotally supported in the back of said casing and operatively connected to said shaft, and electrically operated means disposed between said indicators and said shaft and between said circuit controller and said front panel for locking said shaft against rotation under predetermined conditions.

6. A desk type circuit controller comprising, a casing having a front wall having a transparent panel therein, an operating shaft extending through said front wall, a locking segment on the outside of said wall, a locking sector on the inside of said wall fastened to said shaft, an electrically operated lock for locking said locking sector, a handle on the end of said operating shaft, a spring-pressed manually releasable latch on said handle adapted to engage said locking segment, and electrically operated visual indicating means arranged so as to be visible through said transparent panel.

7. A desk type circuit controller comprising, a casing having a front wall, an operating shaft extending through said front wall, a notched locking segment on the outside of said wall, a locking sector adjacent to and on the inside of said wall fastened to said shaft, an electrically operated lock for locking said locking sector, a handle on the end of said operating shaft; and means for locking said handle to said segment comprising a locking bolt slidably supported in said handle, a spring for urging said bolt into engagement with the notches in said segment, a spindle having an eccentric extension adapted to engage said bolt, and a knob operatively connected to said spindle.

8. A desk-type circuit controller comprising, a base plate, a vertically disposed front wall having indicator openings, electrically operated visual indicators back of said openings, a vertically disposed circuit controller drum in said casing, a horizontally disposed manually operable shaft for actuating said drum extending from said casing, and an electrically releasable means for locking said shaft, said means being located in said casing above said shaft.

9. A desk-type circuit controller comprising, a casing including a front wall, a vertically disposed circuit controller drum in said casing, a horizontally disposed operating shaft operatively connected to said drum projecting through the front wall near the bottom thereof and having a handle secured thereto, means for locking said handle and drum against movement to a full operative position, means adapted for operation by movement of said operating shaft to its half position, and means actuated by said last mentioned means to unlock said locking means whereby further movement of said handle will close a circuit to unlock a co-operating circuit controller.

10. A circuit controller of the type which may be set directly on top of the usual office desk comprising, a casing of general boxlike shape having a front panel containing a transparent panel near the top thereof, electro-responsive indicators back of said transparent panel, a horizontally disposed shaft arranged in the bottom of said casing extending through the front panel thereof and having a gear sector thereon projecting through the bottom of said casing, a lock bar of the rack type engaging said gear sector, an operating handle on the portion of said shaft projecting through the front wall, a vertically disposed circuit controller drum pivotally supported in the back of said casing and operatively connected to said shaft, the operative connection between said drum and shaft comprising a gear having beveled teeth, a gear having spur teeth and a gear having beveled teeth on one side and spur teeth on the other, and electrically operable means adapted to lock said shaft in predetermined positions.

11. An interlocking circuit controller of the type which may be set directly on top of the usual office desk comprising, a base plate, a front panel of metal having integral bosses projecting from the back thereof, a supporting frame screw fastened to said bosses by screws one of which has a long projecting head, electro-responsive devices supported by said supporting frame, a vertically disposed circuit controller drum supported by and screw fastened to said base plate and projecting head, a cover adapted to fit against said base plate and front panel to form a closed casing, and a handle projecting from the front panel operatively connected to said drum.

12. An interlocking circuit controller of the type which may be set directly on top of the usual office desk comprising a base plate, a front panel having integral bosses projecting from the back thereof and having a transparent panel near the top thereof, a supporting frame screw fastened to said bosses by screws of which one has a long projecting head, visual indicators supported by said supporting frame visible from the front of said front panel through said transparent panel, a vertically disposed circuit controller drum supported by and screw fastened to said base plate and projecting head, a cover adapted to fit against said base plate and front panel to form a closed casing, and a handle projecting from the front panel operatively connected to said drum.

13. An interlocking circuit controller of the desk mounted type comprising, a base plate, a front panel secured near the front of said base plate and having a rearwardly projecting boss projecting from near the top thereof, a bolt threaded into said boss projecting to the back of said casing, a vertically disposed frame having two rows of rearwardly projecting contact fingers fastened thereto but insulated therefrom supported on the base plate and secured to said projecting bolt, a circuit controller drum pivotally supported in said frame between said rows of contact fingers and having a plurality of insulated contact segments adapted to engage said contact fingers, a horizontally disposed shaft projecting from the front of said front panel having a handle secured thereto and operatively connected to said drum, an electrically operated locking means for locking said shaft against rotation under predetermined conditions located between said front panel and said circuit controller drum and above said shaft, whereby a compact structure is formed for the various devices in which contact engagement between said segments and contact fingers may be readily inspected.

14. An interlocking circuit controller of the desk mounted type comprising, a base plate, a front panel secured near the front to said base plate having a rearwardly projecting boss near the top thereof, a bolt threaded into said boss projecting to the back of said casing, a vertically disposed frame having projecting legs and two rows of contact fingers fastened thereto but insulated therefrom and having its legs fastened to the base plate and its top portion fastened to said projecting bolt, a circuit controller drum pivotally supported in said frame between said rows of contact fingers having a plurality of insulated contact segments adapted to engage said contact fingers and having a shaft projecting from the bottom of said frame with a gear thereon in close proximity to said base plate, a horizontally disposed shaft projecting from the front of said front panel having a handle thereon and having a beveled gear on the rear end thereof adapted to operate said first mentioned gear, and electrically operated locking means for locking said shaft against rotation under predetermined conditions located between said front panel and said circuit controller drum and above said shaft, whereby a compact structure is formed for the various devices in which contact engagement between said segments and contact fingers may be readily inspected.

15. A desk type circuit controller comprising a casing, a vertically disposed circuit controller unit including a vertically disposed drum supported in a controller frame in the rear of said casing having a pinion at the extreme lower end of said drum, an electrically locked rotatable operating member located in the front lower portion of said casing having a handle extending through the front wall thereof, a bolt projecting back from the front wall of said casing near the top thereof having a reduced threaded extension against which the upper end of said controller frame is bolted, and means for operatively connecting said operating member to the pinion of said drum so that rotation of said member rotates said drum, whereby said drum and controller frame may be removed by moving them directly backward away from the front wall of said casing and off of said bolt so as to afford ready replacement and removal of said circuit controller unit.

In testimony whereof I hereby affix my signature.

RICHARD C. LEAKE.